US008601097B2

(12) United States Patent
Sartori

(10) Patent No.: US 8,601,097 B2
(45) Date of Patent: Dec. 3, 2013

(54) METHOD AND SYSTEM FOR DATA COMMUNICATIONS IN CLOUD COMPUTING ARCHITECTURE

(75) Inventor: Gabriele Sartori, Fremont, CA (US)

(73) Assignee: nComputing Inc., Santa Clara, CA (US)

( * ) Notice: Subject to any disclaimer, the term of this patent is extended or adjusted under 35 U.S.C. 154(b) by 269 days.

(21) Appl. No.: 13/032,387

(22) Filed: Feb. 22, 2011

(65) Prior Publication Data

US 2011/0208837 A1 Aug. 25, 2011

Related U.S. Application Data

(60) Provisional application No. 61/306,905, filed on Feb. 22, 2010.

(51) Int. Cl.
*G06F 15/16* (2006.01)

(52) U.S. Cl.
USPC .......................................... 709/219

(58) Field of Classification Search
USPC .......................................... 709/219
See application file for complete search history.

(56) References Cited

U.S. PATENT DOCUMENTS

| | | | | |
|---|---|---|---|---|
| 5,825,775 | A * | 10/1998 | Chin et al. | 370/401 |
| 6,748,508 | B1 * | 6/2004 | Khandelwal et al. | 711/170 |
| 6,970,602 | B1 * | 11/2005 | Smith et al. | 382/232 |
| 6,989,856 | B2 * | 1/2006 | Firestone et al. | 348/14.09 |
| 7,176,957 | B2 * | 2/2007 | Ivashin et al. | 348/14.09 |
| 7,281,058 | B1 * | 10/2007 | Shepherd et al. | 709/238 |
| 7,685,257 | B2 * | 3/2010 | King et al. | 709/219 |
| 8,149,741 | B2 * | 4/2012 | Dewonck et al. | 370/260 |
| 8,170,123 | B1 * | 5/2012 | Hobgood et al. | 375/240.26 |
| 2003/0092421 | A1 * | 5/2003 | Dolwin | 455/403 |
| 2005/0007965 | A1 * | 1/2005 | Hagen et al. | 370/260 |
| 2005/0220126 | A1 * | 10/2005 | Gervais et al. | 370/401 |
| 2006/0184614 | A1 * | 8/2006 | Baratto et al. | 709/203 |
| 2008/0162635 | A1 * | 7/2008 | Keren | 709/204 |
| 2008/0201485 | A1 * | 8/2008 | Patwardhan et al. | 709/238 |

FOREIGN PATENT DOCUMENTS

EP 1737235 A2 * 12/2006

* cited by examiner

*Primary Examiner* — Christopher Biagini

(74) *Attorney, Agent, or Firm* — Schwegman, Lundberg & Woessner, P.A.

(57) ABSTRACT

Example embodiments of the present disclosure concern a system and method for selectively intercepting communications in a cloud computing environment by receiving communications from one or more thin-client terminal systems connected via a local area network, determining one or more recipients of each received communication, and based on a determination that the one or more recipients of a communication include only thin-client terminal systems connected via the local area network, intercepting the communication and preventing the communication from being transmitted to a central server connected to the local area network via a wide area network, storing the communication, and forwarding the communication to the one or more recipients connected to the local area network.

16 Claims, 8 Drawing Sheets

METHOD AND SYSTEM FOR DATA COMMUNICATIONS IN CLOUD COMPUTING ARCHITECTURE

CROSS-REFERENCE TO RELATED APPLICATIONS

This application claims the benefit of priority under 35 U.S.C. §119(e) to U.S. Provisional Patent Application Ser. No. 61/306,905, filed Feb. 22, 2010, ("METHOD AND SYSTEM FOR DATA COMMUNICATIONS IN CLOUD COMPUTING ARCHITECTURE"), which is incorporated herein by reference in its entirety.

TECHNICAL FIELD

Example embodiments of the present disclosure relate to selectively communicating data. In particular, but not by way of limitation, the present disclosure discloses techniques for communicating data between a plurality of client devices on a local area network in a cloud computing architecture.

BACKGROUND

Centralized computer systems with multiple independent terminal systems for accessing the centralized computer systems were once the dominant computer system architecture. These centralized computer systems were initially very expensive mainframe or mini-computer systems that were shared by multiple computer users. Each of the computer system users accessed the centralized computer systems using a computer terminal system coupled to the centralized computer systems.

In the late 1970s and early 1980s, semiconductor microprocessors and memory devices allowed for the creation of inexpensive personal computer systems. Personal computer systems revolutionized the computing industry by allowing each individual computer user to have access to a full computer system without having to share the computer system with any other computer user. Each personal computer user could execute their own software applications, and any problems with the computer system would only affect that single personal computer system user.

Although personal computer systems have become the dominant form of computing in the modern world, there has been a resurgence of the centralized computer system model wherein multiple computer users access a single server system using modern terminal systems that include high-resolution graphics. An example of this centralized architecture is cloud computing. Cloud computing provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Traditional cloud computing systems provide resources to a plurality of personal computers (i.e., "fat" clients) that are connected via a wide area network (WAN) to a server in the cloud. Cloud computing allows multiple users to easily share the same set of software applications.

In a conventional cloud computing implementation, all processing is done in the cloud while the user gets access with a lightweight client that has the smallest amount of processing. Bandwidth challenges may arise when a considerable number of video streams are managed on some of the clients. Each client will have one or more streams concurrently going back and forth between the client itself and the server in the cloud. The challenge is exacerbated when the clients aren't simply rendering multimedia but are also creating an uplink stream for example for videoconferencing purposes.

For example, assume H.264 HDTV streams use a relatively high level of compression of 2-3 Mbit/stream. A situation where 20 users are participating in the same videoconference, using their desktop computers, would create a 2 Mbit uplink stream for each user and potentially 2×20 Mbit/sec for the downstream to each user for a total aggregate of 840 Mbit/s. Even with techniques of broadcasting, in the given example the total aggregate bandwidth utilization would be 2×2×20 Mbit/s or 40+40 Mbit (up/down), a small number for a local area network (LAN) and significantly higher bandwidth consumption for a WAN. If the number of users concurrently using the HD videoconferencing application grows to 100, the total bandwidth on the WAN connected to the cloud sever would be 200+200 Mbit/s.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In an example embodiment, client devices (e.g., a plurality of thin clients) are connected via a LAN and a WAN to a central server in the cloud. Virtualization software may be deployed on one or more central servers. A plurality of virtual machines in the cloud may thus provide full or fat client functionality to each thin client on the LAN. In accordance with an example embodiment, a data distribution device of module software is provided locally (as opposed to being provided in the WAN) that selectively distributes data (e.g., multimedia packets) to the local clients. Accordingly, in an example embodiment, data (e.g., multimedia packets) are communicated between the local thin clients directly and are not routed to the central server via the WAN. Accordingly, bandwidth on the WAN may be reduced. In an example embodiment, data is also selectively communicated to the central computer in the cloud but may, for example, be compressed to reduce the bandwidth needed to communicate the data. Thus, for example full high definition (HD) multimedia data may be communicated between local clients virtualized in the cloud.

Although some example embodiments are described with reference to cloud computing, it is to be appreciated that the example embodiments are not restricted to cloud computing architecture but rather may apply to any architecture where bandwidth-intensive communications take place on a LAN communicating via a WAN to a central computer.

Computer Systems

The present disclosure concerns the distribution of data (e.g., multimedia data) between client devices and a central server(s) in a cloud computing architecture.

Figure 1:
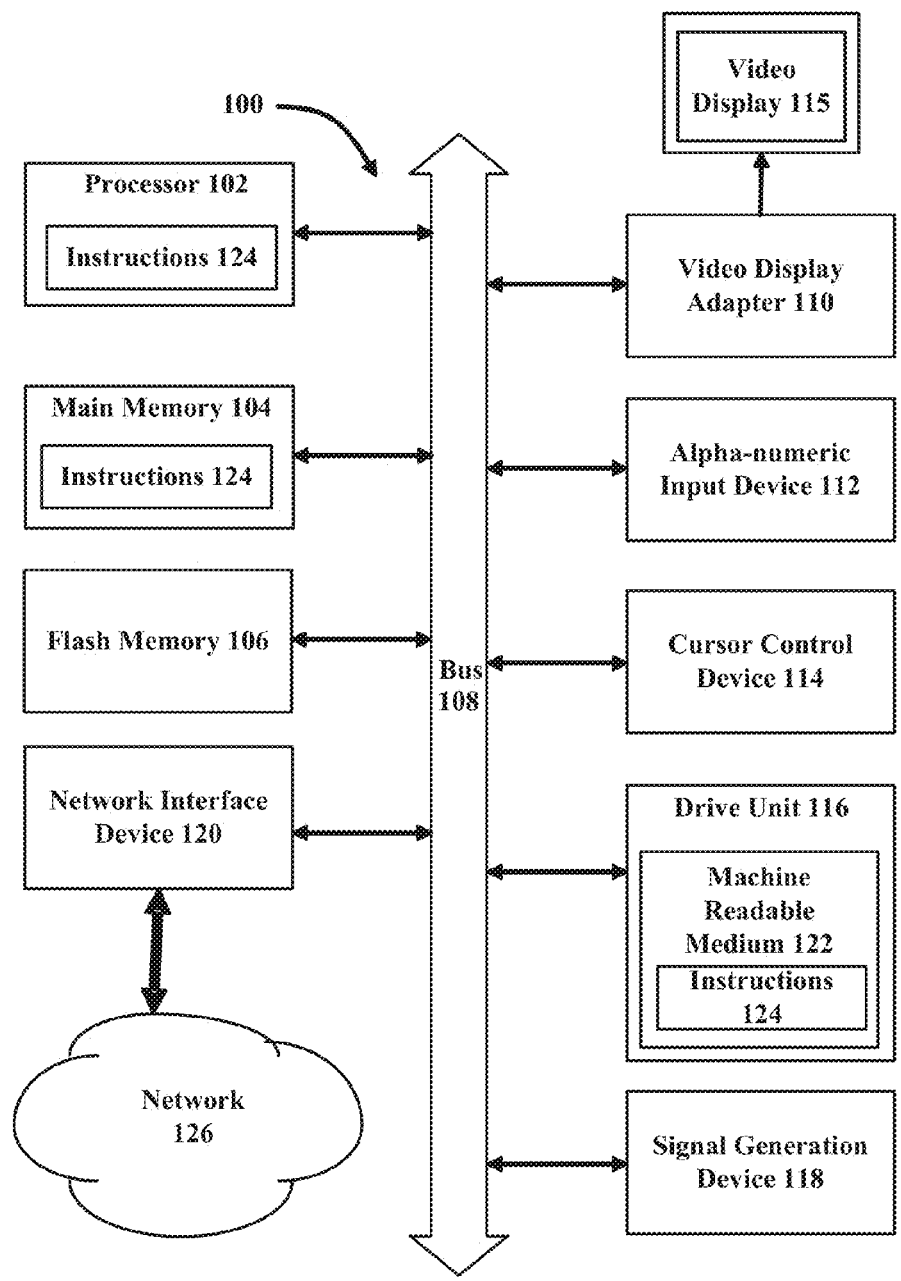
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of machine in the example form of a computer system 100 that may be used to implement portions of the present disclosure. For example, the computer system 100 may run virtualization software and define a central computer in the cloud. The computer system 100 may also define a data distribution device provided at a LAN for distributing communications between a plurality of thin clients on a LAN serviced by virtual machines in the cloud.

Within computer system 100 there are a set of instructions 124 that may be executed for causing the machine to perform any one or more of the methodologies discussed herein. In a networked deployment, the machine may operate in the capacity of a server machine (e.g., in the cloud) or a client machine (e.g., trapping communications from thin clients) in a client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a flash memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware. For example, a module may be implemented or executed by one or more processors to achieve or implement its particular function, operation, process, or procedure.

In an example embodiment, the computer system 200 provides a centralized server in the cloud that allows standard Linux- and Windows-based PCs to be shared by multiple simultaneous users. Each user at local client may run virtualized applications in the cloud as if they are their own applications.

Thin-Client Systems

In recent years, a new generation of terminal systems that support high-resolution graphics have been introduced into the computer market. These new terminal systems have allowed a new generation of users to rediscover many of the advantages of a terminal-based computing architecture. For example, computer terminals allow for improved computer system security and reduced maintenance costs since users of computer terminal systems cannot easily introduce computer viruses by downloading or installing new software into the computer system from the terminal system. Thus, with a centralized computer system having multiple terminals, only the main centralized computer server system needs to be closely monitored and maintained. Cloud computing systems allow the sharing of computer resources instead of having local devices handle specific applications.

One category of modern terminal systems is called "thin client" systems since the terminal systems are a "client" to a main computer system (e.g., central computer(s) in the cloud) that acts as a server and the terminal systems are designed to be very simple and limited (thus "thin"). These thin-client terminal systems primarily depend on a thin-client server system for all (or nearly all) of their application processing activities. A thin-client terminal system thus mainly focuses only on conveying output from the centralized server system to the user and input from the user to the centralized server system.

The new generation of computer terminal systems provides features that did not exist during the prior era of computer terminal usage. Specifically, modern terminal systems include modern amenities such as high-resolution graphics capabilities, audio output, and a cursor control system input (e.g., mouse, trackpad, trackball, etc.). Thus, modern terminal systems can provide all of the features that users of modern personal computer systems have become accustomed to using. Example embodiments in accordance with the present disclosure may allow data exchange such as multimedia video conferencing between client computers in a cloud computing architecture where all communications are not sent to the cloud and then returned to a LAN for distribution. In an example embodiment, a distribution device or software module(s) is provided at the LAN to reduce (and optionally prevent) communications from the local clients reaching the central computer in the cloud. Thus, the communications are reduced between the thin clients virtualized on a central computer in the cloud and instead distributed or routed locally thereby at least reducing network traffic at the WAN level.

Figure 2A:
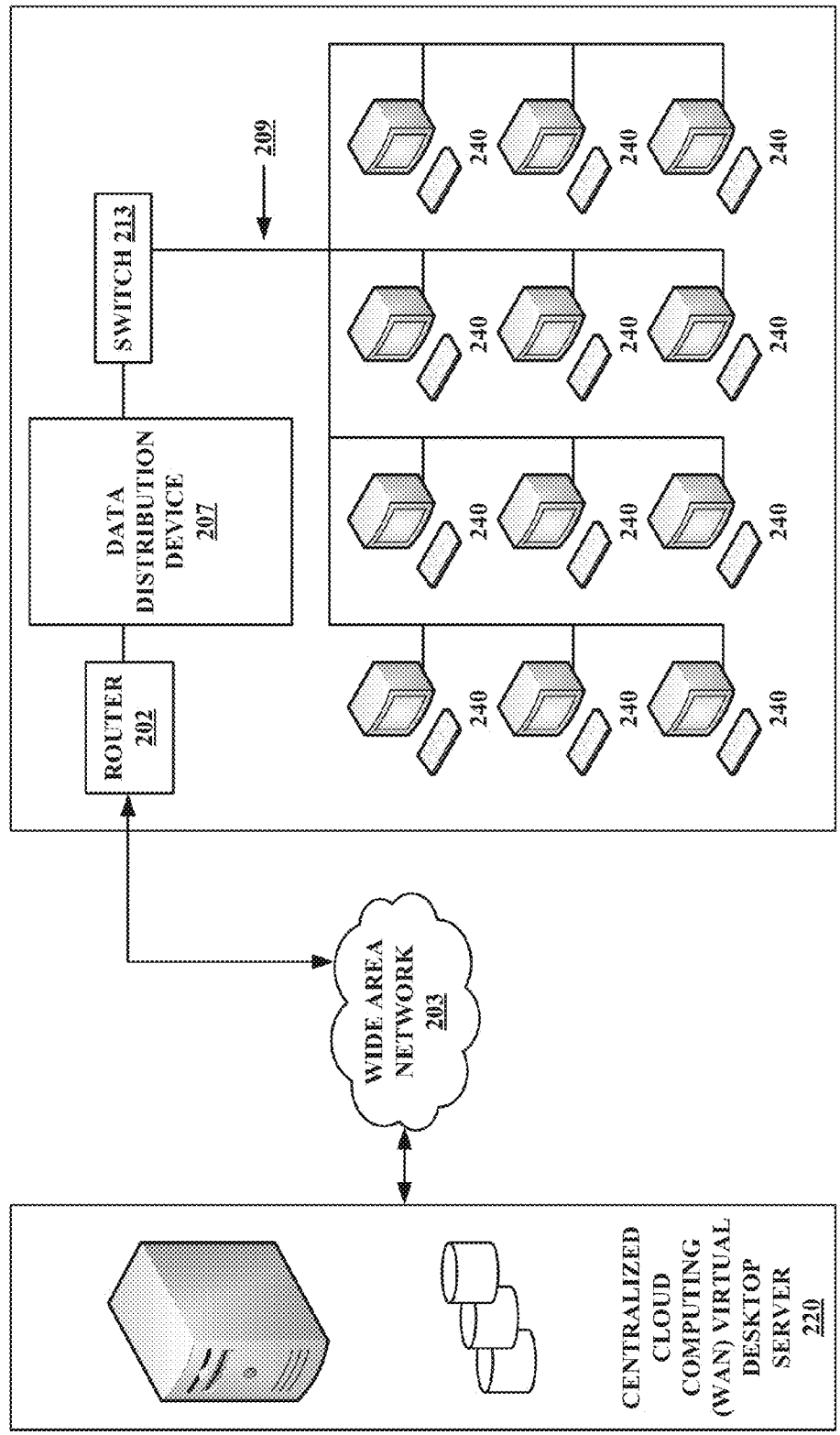
FIG. 2A illustrates a high-level block diagram of cloud computing architecture including a central server supporting multiple individual clients (e.g., thin-client terminal systems) using a local area network in accordance with an example embodiment.

FIG. 2A illustrates a high-level block diagram of a cloud computing architecture including a central server (e.g., cloud server system 220) supporting multiple individual clients (e.g., thin-client terminal systems 240) using a local area network 209 in accordance with an example embodiment. The thin-client terminal systems 240 are shown by way of example to be connected via a switch 213 to a LAN 209. The switch 213 is shown by way of example to be connected via a data distribution device 207, in accordance with an example embodiment, to a WAN 203 which is connected to a central server (e.g., provided by the cloud server system 220) in the cloud. In an example embodiment, the cloud server system 220 runs virtualization software to provide a virtual machine for each thin-client terminal system 240.

In an example embodiment, a data distribution device 207 (or software module) is a "cache and forward" blade server. The server intercepts the communications from the client devices (e.g., UXP, RDP, or the like protocol stream) and eliminates the uplink video stream to the central server in the cloud. Each stream (e.g., multimedia stream) may be buffered locally at the local distribution device (e.g., in the DRAM of a local server) in order to compensate for network latency.

In an example embodiment in which a thin client has a virtualized desktop provided by the central server in the cloud (e.g., cloud server system 220), each local client (e.g., each local thin client 240) may then receive a virtual desktop. The caching and forwarding service provided by the local distribution device 207 (or software/firmware module(s)) may re-introduce the desired stream(s) in the communication protocol going to that particular thin client. It should be noted that the data distribution device 207 selectively traps communications from the example thin-client terminal systems 240. For example, communication from the thin-client terminal systems 240 to the cloud server system 220 that are not bandwidth intensive or that do not require communication to other thin clients may pass unhindered through the data distribution device 207 to the cloud server system 220. For example, if a thin-client terminal system 240 is using a word processing application virtualized on the cloud server system 220, such communications may pass through the data distribution device 207 unhindered and may thus not be re-routed or trapped. However, a multimedia communication between two or more thin-client terminal systems 240 may be trapped and routed directly to the thin-client terminal systems 240 without further communication to the cloud server system 220.

In an example embodiment, the cloud server system 220 may communicate instructions to the data distribution device 207 to control the trapping and distribution of data on the local LAN 209.

In an example embodiment, one or more external users (e.g., users out of the LAN located, for example, at another geographical location and, optionally, connected to the WAN) may be provided. In an example embodiment, if these external users are running the same desktop conferencing application as those clients on the LAN, the data distribution device 207 (or software module) may require an originating client device on the LAN to flag that particular stream so it will not be eliminated from the data distribution server 207 to the central server 220. Accordingly, the data distribution device 207 may selectively trap communications within a LAN, communicate some of the communications to central server for communication to another LAN and so on.

In an example embodiment, all of the data traffic (e.g., multimedia traffic such as video) will be local unless an external user will need one or more particular media stream. In a similar fashion, audio may instead or in addition be trapped or selectively communicated to the central server in the cloud.

Thus, for example, in an example embodiment, multimedia streams may be made available to all the users on a LAN that need it in a broadcast fashion so a single stream will serve multiple users displaying the same video without sending the multimedia stream to the central server for processing and then returning it to the LAN for distribution.

In another example embodiment, the local distribution device (or software module(s)) may transcode the multimedia streams to a smaller format that is communicated to the central computer in the cloud. Accordingly, in an example embodiment, local users may have a full HDTV rendering of each stream on their client devices, whereas remote users (e.g., users at one of more different locations on their associated LANs) may have a smaller resolution and higher compression in order to save bandwidth between the local network of client devices and the central server. Bandwidth requirements or consumption on the WAN may thus be reduced. Local scalers may be provided on a LAN to upscale multimedia for display on the local client devices. The multimedia being upscaled may be received from device(s) on another LAN.

In an example embodiment, two data streams may be generated concurrently, one in full size and one in "stamp size". The data streams may be used for multi-user video-conferencing applications. The users may be able to see all other conference participants all the time where the user will have the size of a large icon or a "stamp" shown on his/her associated client device. Functionality may be provided to enlarge and see on a full screen only the desired or selected user. For example, a media stream corresponding to the user that is talking may be seen in full size on other user's client devices, while all the other listening participants will be seen as stamp size image (still or video). In an example embodiment, all the full size streams received from each client device of non-talking participants will be stopped or trapped, and only reduced streams are forwarded by the distribution device (or software) to the other client devices on the WAN (or to the central server). Streams with stamp or "avatar" size may always be broadcasted.

In an example embodiment, the thin client terminal system 240 may have little or no intelligence but provide a relatively seamless desktop PC experience via the virtualization/multi-user software provided on the cloud server system 220. The full desktop PC experience on the thin client terminal system may include multimedia (e.g., video conferencing, DVD or Blu-Ray playback, video camera upload and sharing). An example of such a thin-client system is available from nComputing, Inc. of California. Examples of the virtualization/multi-user software include software such as Vmware, Vspace, Citrix or Microsoft terminal services or the like. Examples of protocols for communicating between the thin clients on the local network and the central computer in the cloud include remote desktop protocols such as UXP, RDP, ICA, PCoIP or the like.

In an example embodiment, the local clients may have full media upstream and sharing. Accordingly, a client may have a HDTV camera and run a videoconference session where the content is displayed on all the other desktops resident either on the internal network (LAN) or external network (WAN)

In an example embodiment, the data distribution device 207 may cache all bandwidth-intensive uplink packets and selectively communicate them between local thin clients without communication thereof to the virtualization/multi-user software in the cloud. In an example embodiment, the server in the cloud (e.g., the cloud server system 220) may instruct the data distribution device 207 (e.g., a server device, PC or similar device, a router, or any other computing device with software for deploying the methodologies described herein) about the communication streams (e.g., multimedia streams) that do not need to be uplinked to the cloud server. In an example embodiment, these packets may be substituted with empty tagged packets that are communicated from the data distribution device 207 to the cloud server (e.g., the cloud server system 220).

If, for example, a local client opens a videoconference session with another local client on the LAN 209, the audio-visual (AV) packets will not travel to the main server in the cloud. Instead, the AV packets may be temporarily stored in the data distribution device 207 and then re-injected in the protocol stream coming from the cloud server (e.g., cloud server system 220) and going to the receiving client. The same packets may be re-injected into multiple streams if multiple clients will display the same source stream. Accordingly, bandwidth consumption on the WAN may at least be reduced as communications on both uplink and downlink stream may be reduced.

If a particular AV (or other data) stream will be necessary in a different geographical location (e.g., on a different LAN optionally connected to the WAN 203) it may not be eliminated from the uplink stream, yet it may still be missing in the local downlink stream and re-injected locally at the data distribution device 207 for communication to the thin-client terminal systems 240.

A Thin-Client System

Figure 2B:
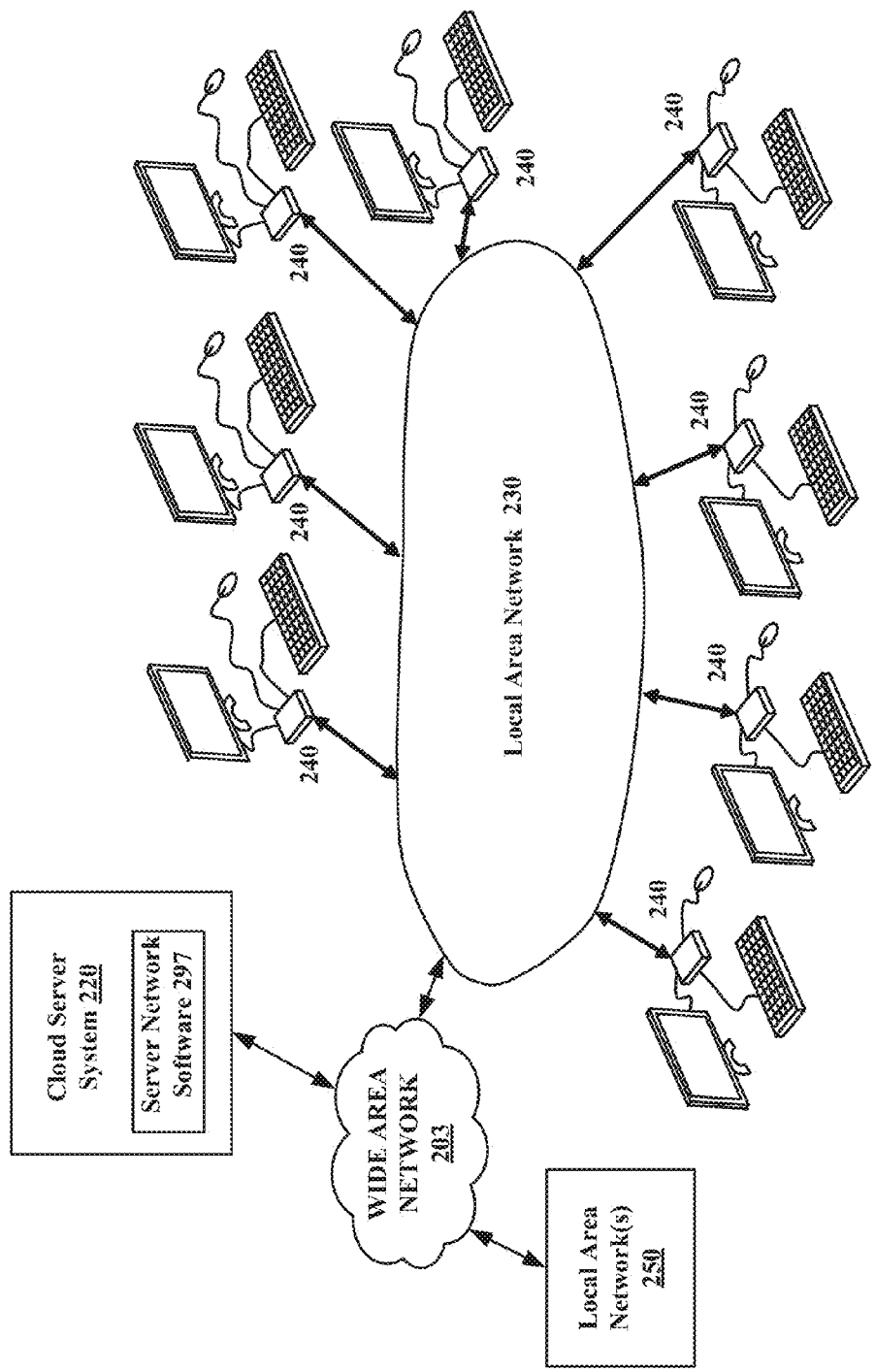
FIG. 2B illustrates an example embodiment of a thin client arrangement that may be used in the cloud computing architecture of FIG. 2A.

FIG. 2B illustrates an example embodiment of a thin client arrangement that may be used in the cloud computing architecture of FIG. 2A.

Referring to FIG. 2B, a single thin-client server computer system 220 provides computer-processing resources to many thin-client terminal systems 240. In the example embodiment of FIG. 2B, each of the individual thin-client terminal systems 240 is coupled to the thin-client server computer system 220 in the cloud via bi-directional communication channels provided by a WAN 203 and a LAN 230. The LAN 230 may be substantially similar to the LAN 209 discussed with reference to the example embodiments of FIG. 2A.

The individual thin-client terminal systems 240 may transmit user input (such as key strokes and mouse movements) across the LAN 230 and the WAN 203 to the thin-client server system 220 in the cloud. The thin-client server system 220 transmits output information across the WAN 203 and the LAN 230 to the individual thin-client terminal systems 240.

Figure 2C:
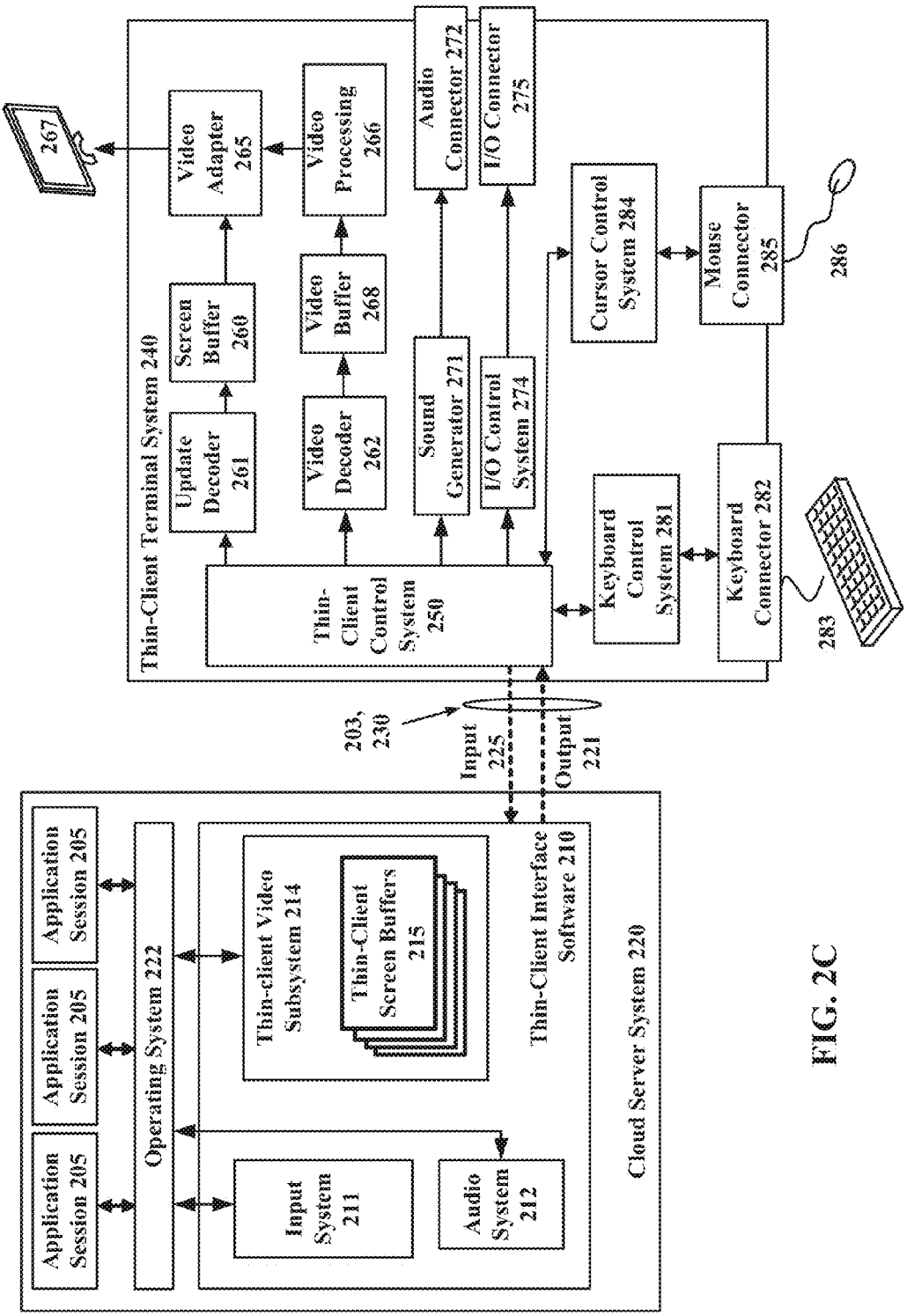
FIG. 2C illustrates a block diagram of example thin-clients and application software resident on the central server shown in FIG. 2A.

FIG. 2C illustrates a block diagram of example thin-clients and application software resident on the central server shown in FIG. 2A. In FIG. 2C, the thin-client server computer system 220 coupled via the WAN 203 and the LAN 230 (see FIG. 2B) to one (of possibly many) thin-client terminal systems 240. The thin-client server computer system 220 and thin-client terminal system 240 are coupled with a bi-directional digital communications channel 230 that may be a serial data connection, an Ethernet connection, or any other suitable bi-directional digital communication means such as the local area network 230 of FIG. 2B.

In an example embodiment, the goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead. Keeping the cost low can be achieved since the thin-client terminal system 240 will not need the full computing resources or software of a personal computer system since those features will be provided by the thin-client server system 220 that will interact with the thin-client terminal system 240.

Referring back to FIG. 2C, the thin-client terminal system 240 provides both visual and auditory output using a high-resolution video display system and an audio output system. The high-resolution video display system consists of a graphics update decoder 261, a screen buffer 260, and a video adapter 265. When changes are made to a representation of a terminal's display in thin-client screen buffer 215 within the server system 220, a graphics encoder 217 identifies those changes to the thin-client screen buffer 215, encodes the changes, and then transmits the changes to the thin-client terminal system 240. Within the thin-client terminal system 240, the graphics update decoder 261 decodes graphical changes made to the associated thin-client screen buffer 215 in the server and applies those same changes to the local screen buffer 260 thus making screen buffer 260 an identical copy of the bit-mapped display information in thin-client screen buffer 215. Video adapter 265 reads the video display information out of screen buffer 260 and generates a video display signal to drive display system 267.

In an alternate embodiment, a parallel full-motion video system is provided to handle full motion video. The parallel system comprises a video decoder 262 for decoding a full motion video stream, a video buffer 268 for storing video frames from the decoded video stream, and a video processor 266 for reformatting the full motion video for display within a window in the screen buffer 260. The video display driver 265 integrates the two video processing paths. The data distribution device 207 (see FIG. 2A) may then trap the video and, for example, prevent it from being sent to the server system 220. Instead, the data distribution device 207 may rather directly route the video to other thin-client terminal system 240.

The audio sound system of thin-client terminal system 240 operates in a similar manner to the video system. The audio system consists of a sound generator 271 for creating a sound signal coupled to an audio connector 272. The sound generator 271 is supplied with audio information from the thin-client control system 250 using audio information sent as output 221 by the thin-client server system 220 across bi-directional communications channel 230.

From an input perspective, thin-client terminal system 240 allows a terminal system user to enter both alpha-numeric (keyboard) input and cursor control device (mouse) input that will be transmitted to the thin-client computer system 220. The alpha-numeric input is provided by a keyboard 283 coupled to a keyboard connector 282 that supplies signals to a keyboard control system 281. Thin-client control system 250 encodes keyboard input from the keyboard control system 281 and sends that keyboard input as input 225 to the thin-client server system 220. Similarly, the thin-client control system 250 encodes cursor control device input from cursor control system 284 and sends that cursor control input as input 225 to the thin-client server system 220. The cursor control input is received through a mouse connector 285 from a computer mouse 285 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2C includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client terminal systems 240. As illustrated in FIG. 2C, thin-client interface software 210 in thin-client server system 220 supports the thin-client terminal system 240 as well as any other thin-client terminal systems coupled to thin-client server system 220. The thin-client server system 220 keeps track of the state of each thin-client terminal system 240 by maintaining a thin-client screen buffer 215 in the thin-client server system 220 for each thin-client terminal system 240. The thin-client screen buffer 215 in the thin-client server system 220 contains representation of what is displayed on the associated thin-client terminal system 240.

Figure 3:
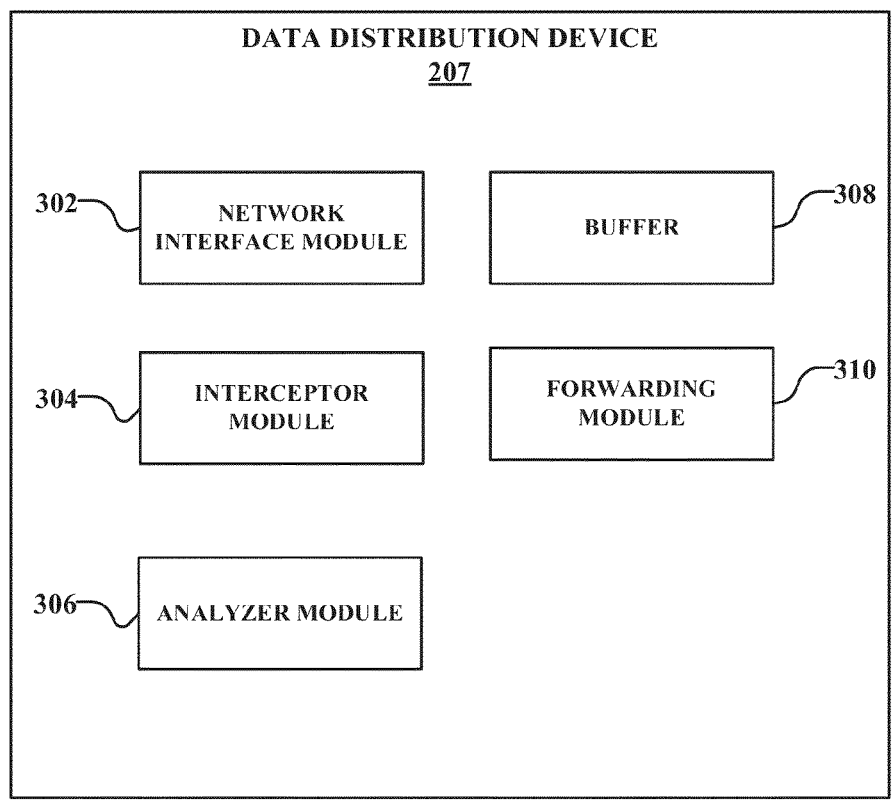
FIG. 3 illustrates a diagram of an example embodiment of a data distribution device.

FIG. 3 illustrates a diagram of an example embodiment of a data distribution device. The data distribution device may include a set of modules that implement various functionality of the data distribution device or carry out operations performed by the data distribution device. A network interface module 302 may connect the data distribution device to one or more client devices (e.g., thin client terminal systems 240 of FIG. 2A) in a local area network 209, for example, via a switch 213. The network interface module 302 may receive communications transmitted by the one or more client devices 240 to a server (e.g., central server 220) in a cloud computing environment.

An interceptor module 304 may selectively intercept communications sent by the one or more client devices 240 to the server 220. The communications may be multimedia data streams encoded according to one or more remote desktop protocols (e.g., UXP, RDP, ICA, PCoIP). In other example embodiments, the communications may be data streams containing input commands (e.g., keyboard input, mouse input) or data streams related to a virtualized application (e.g., a virtualized word processing application provided by central server 220).

An analyzer module 306 may operate with the interceptor module 304 to analyze the intercepted data streams. The analyzer module 306 may determine certain characteristics of the data stream, such as the size or amount of bandwidth occupied by the data stream, the destination(s) of the data stream, and the type of data contained in the data stream. If the data stream contains certain characteristics, the analyzer module 306 may notify the interceptor module 304 to trap or prevent the data stream from reaching its destination(s). For example, if the data stream is destined solely for transmission to other client devices on the local area network, the interceptor module 306 may trap the communications and prevent the data stream from being sent to the central server 220, thereby reducing the traffic on the wide area network 203 connecting the central server 220 and the local area network 209. If the data stream is a bandwidth-intensive stream, the interceptor module 306 may trap the data stream and either prevent it from being transmitted to the central server 220 or perform additional processing on the data stream to reduce its impact on the WAN 203. In another example embodiment, if the data stream is not bandwidth-intensive, the interceptor module 306 may permit the data stream to be transmitted to the central server 220.

A buffer 308 may receive trapped data streams from the interceptor module 306 and may buffer those data streams to reduce network latency. The buffer may be implemented in the memory (e.g., RAM) of the data distribution device.

A forwarding module 310 may forward cached or buffered data streams that are trapped by the interceptor module 306 back to the thin-client terminal systems to which the data streams are directed. The forwarding module 310 may forward these data streams by re-introducing the data stream into the communications sent to the particular thin-client terminal systems by the central server 220. In another example embodiment, the forwarding module 310 may broadcast a trapped data stream having multiple destination recipients to multiple thin-client terminal systems on the local area network. The broadcasting ability may eliminate the need to send the trapped data stream to the central server 220 and to have the central server 220 send the same data stream to multiple thin-client terminal systems connected via the local area network. In another example embodiment, the forwarding module 310 may forward data streams that are not trapped to the central server 220. In one example embodiment, certain data streams that are not trapped but are bandwidth-intensive may be transcoded by the forwarding module 310 to reduce the amount of bandwidth consumed. Whether a data stream is transcoded may be determined by examining the bandwidth consumption of the data stream and comparing the bandwidth consumption to a predetermined threshold. If the bandwidth consumption of the data stream is greater than the predetermined threshold, the data stream may be transcoded. If the bandwidth consumption of the data stream is less than the predetermined threshold, the data stream may be forwarded in an unmodified state. The threshold may be dependent on the capabilities of the WAN as well as on other policy and performance objectives. In other example embodiments, a separate transcoding module or sub-module (not shown) may perform the transcoding or compression of the data stream.

Figure 4:
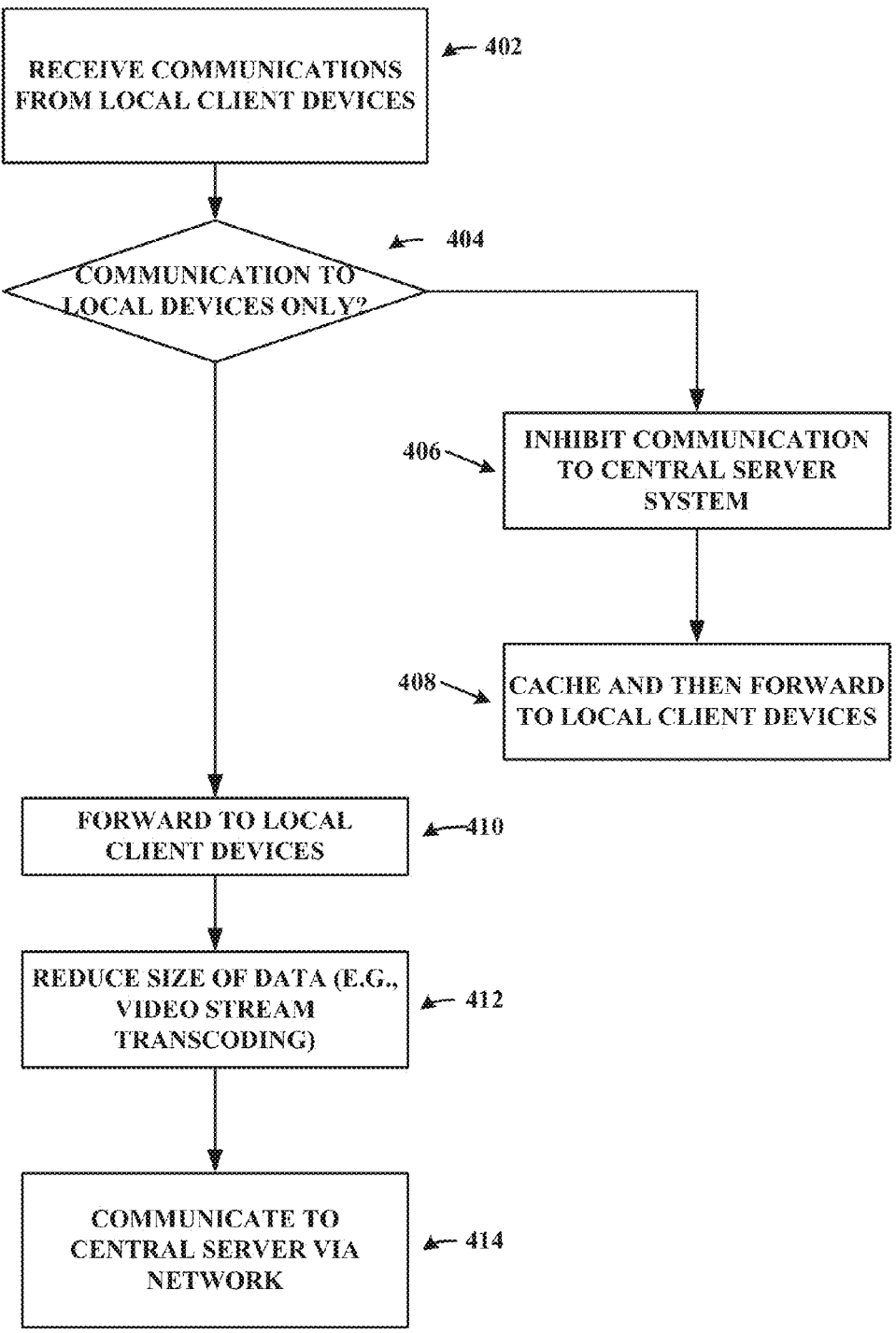
FIG. 4 illustrates an example method for selectively communicating data (e.g., multimedia communications) between a thin client and a central server in the cloud.

FIG. 4 illustrates an example method 400 for selectively communicating data (e.g., multimedia communications) between a thin client and a central server in the cloud. The example method 400 may be deployed in any device at a geographical location including multiple clients (e.g., on a LAN) communicating via a WAN with a central server(s). In an example embodiment, the method 400 is deployed in a data distribution device to trap bandwidth-intensive communications from thin clients on a local area network destined for a central server that provides virtualization software to service the thin clients. As the method 400 may, for example, be deployed on the data distribution device 207, it is described merely by way of example with reference thereto.

Referring to FIG. 4, at block 402 the data distribution device 207 may receive communications from one or more local thin clients. The communications may be bandwidth-intensive communications such as video-conference communications between two or more participants using thin clients on the LAN 209.

As shown at block 404, the method 400 may then determine that the communications are for other thin clients on the LAN 209 and, hence, need not be communicated to the central server (e.g., the cloud server system 220). The method may then inhibit communications of this data (e.g., H.264 packet data) to the central server as shown at block 406. The communications (e.g., H.264 packets) may be cached at the data distribution device 207 and forwarded to the local thin clients on the LAN 209 (see block 408). Identification of which packets are to be trapped within the LAN 209 and not sent to the central server, may be based on flags in the communications. In an example, the thin client devices are unaware that the communications are being trapped and are thus totally unaware of the rerouting of the communications. Thus, the data distribution device 207 may perform the functionality described herein without any modification to the thin client devices.

If the communications from a thin client are also required to be sent to one or more other clients not on the LAN 207, then the data distribution device 207 forwards the communications to the local clients (see block 410), reduces the size of the data (e.g., transcodes the video data in a video conference stream (see block 412) and forwards the reduced data to the central server via the network (e.g., the WAN 203).

Figure 5:
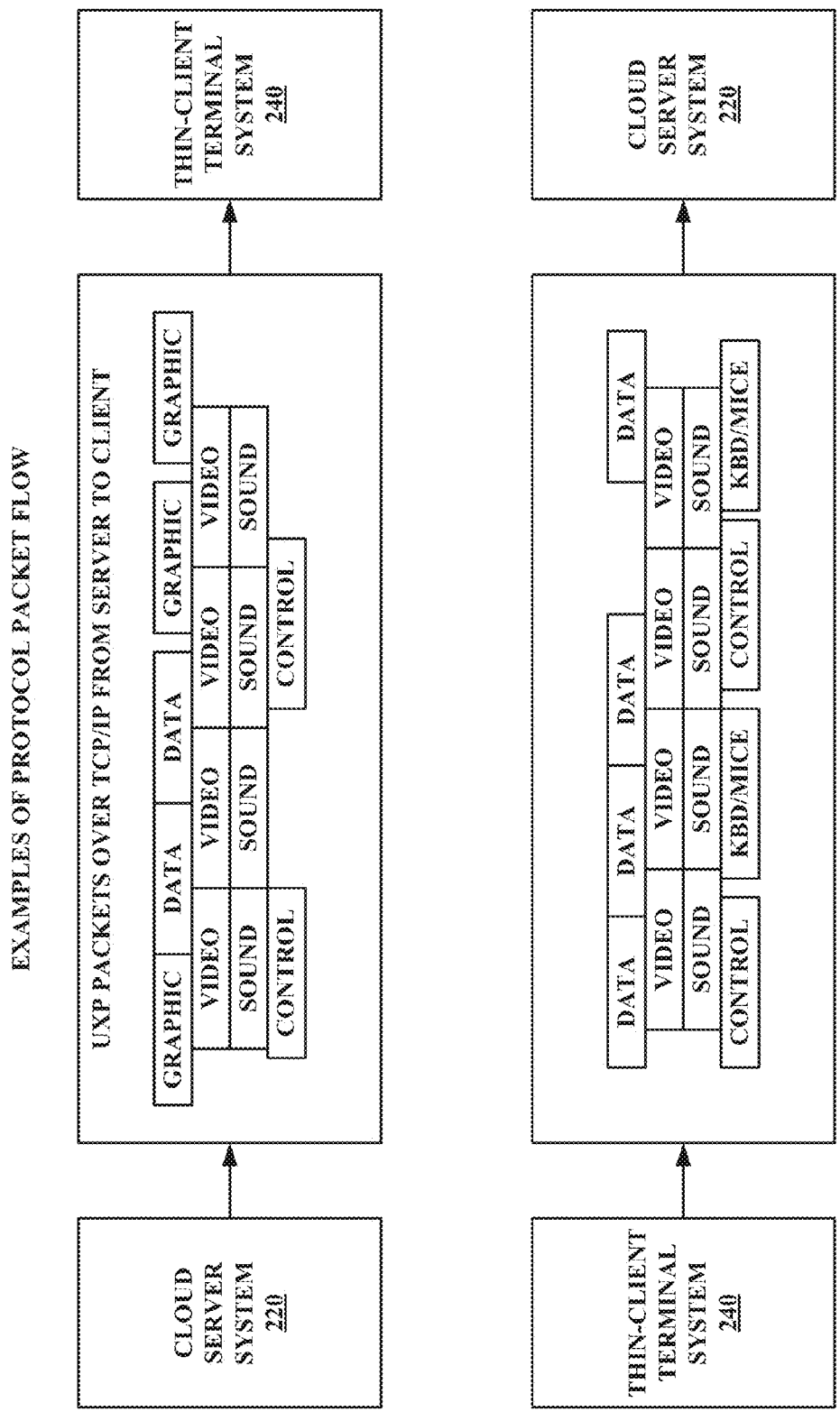
FIG. 5 illustrates an example protocol for communicating between a thin client on a LAN and a central server in the cloud.

FIG. 5 illustrates an example protocol for communicating between a thin client on a LAN and a central server in the cloud. It is to be noted that any suitable protocol for connecting thin clients to a virtualized server may be used. For example, example embodiments may use a remote desktop protocol like UXP, RDP, ICA, PCoIP or the like.

In the example protocol shown in FIG. 5, graphics data is shown to be unidirectional since the cloud server (e.g., cloud server system 220) updates the client devices (e.g., the thin-client terminal systems 240) only. Video, audio and data can be bi-directional since media capturing devices (e.g., a webcam) can be on the client and data may be stored (e.g., on a USB memory stick coupled to the thin client device). The data distribution system may avoid the necessity of packets being sent from each client to the server, and when shared, from the server returning packets back to the other clients, as redistribution or routing takes place locally.

Thin-Client Terminal System Connections

Figure 6:
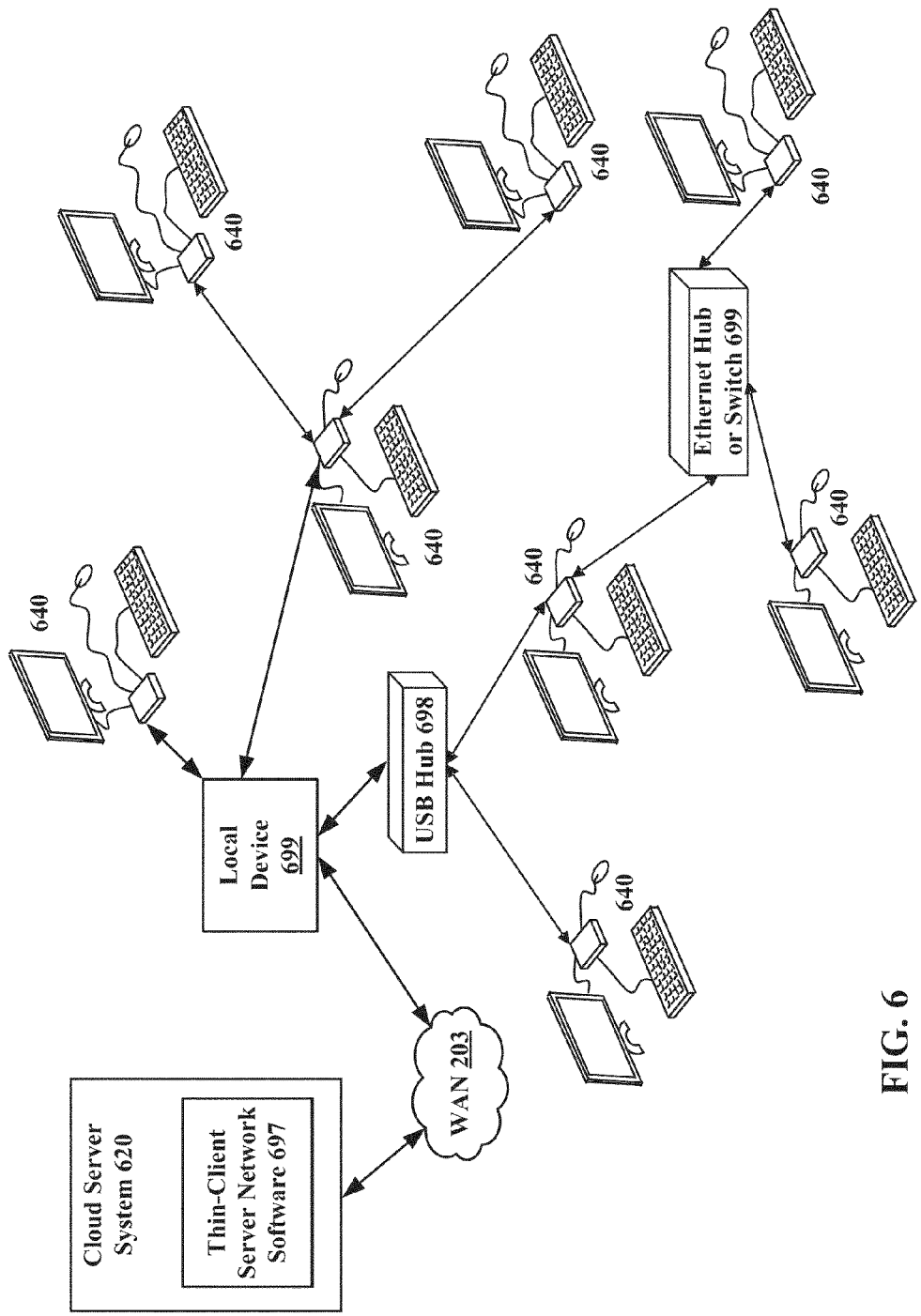
FIG. 6 illustrates various different permutations of coupling thin-client terminal devices to a WAN connected to a central cloud server.

With the thin-client architecture set forth in FIGS. 2A-C, many different permutations of systems may be coupled together. FIG. 6 illustrates many of the connections that may be made. A thin-client terminal system 640 may be coupled via a network (including one or more network elements such as the WAN 203) to a server system 620 remotely located (e.g., in the cloud). A thin-client terminal system 640 may be coupled to another thin-client terminal system 640 using a USB connection that is in turn directly coupled to a server system 620. A thin-client terminal system 640 may be coupled to a USB hub 698 that is coupled to a server system 620 via a local device 699. The local device may include substantially similar functionality as the data distribution device 207. The local device 699 may be a computing device (e.g., the computer system 100 shown in FIG. 1) running software that provides software to perform the methodologies and functionality described herein.

A thin-client terminal system 640 may be coupled to an Ethernet hub or switch 699 that is coupled to another thin-client terminal system 640 that is coupled to a USB hub 698 that is directly coupled to a server system 620. Many additional permutations exist as will be clear to those skilled in the art.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A data distribution device to selectively intercept communications in a cloud computing architecture, the data distribution device comprising:
   one or more processors; and
   one or more memories in communication with the one or more processors, the one or more memories storing:
      interceptor software in communication with the one or more processors and configured to cause the one or more processors to selectively intercept data streams transmitted by at least one thin-client terminal system communicatively connected to the data distribution device via a local area network, the data distribution device also communicatively connected to a central server via a wide area network;

analyzer software in communication with the one or more processors and configured to cause the one or more processors to analyze the data streams to identify characteristics of the data streams, the characteristics including at least one destination of the data streams, the interceptor software selectively intercepting a data stream that does not have the central server as a destination of the data stream and preventing the data stream from being transmitted to the central server;

a buffer configured to store the selectively intercepted data stream; and forwarding software in communication with the one or more processors and configured to cause the one or more processors to inject the selectively intercepted data stream in a communication from the central server to a thin-client terminal system identified as a destination in the selectively intercepted data stream.

2. The data distribution device of claim 1, wherein the forwarding software is further configured to:

for the data streams having the central server as a destination and a bandwidth intensity above a predetermined threshold, transcode the data streams from a first encoding format to a second encoding scheme, the second encoding format being smaller than the first encoding format; and transmit the transcoded data stream to the central server.

3. The data distribution device of claim 1, wherein the data streams are multimedia data streams generated by a videoconferencing application.

4. The data distribution device of claim 1, the one or more memories further comprising transcoding software configured to transcode the selectively intercepted data stream from a first encoding format to a second encoding format, the second encoding format being smaller than the first encoding format.

5. The data distribution device of claim 1, wherein the forwarding software is further configured to transmit an empty tagged data stream to the central server in place of the selectively intercepted data stream.

6. The data distribution device of claim 1, wherein the interceptor software is configured to prevent the selectively intercepted data stream from being transmitted to the central server by removing an uplink stream in the selectively intercepted data stream.

7. The data distribution device of claim 1, wherein the interceptor software receives an instruction from the central server to selectively intercept the data stream.

8. The data distribution device of claim 1, wherein the analyzer software is configured to analyze the data streams by further determining a setting of a flag in the data streams, wherein the interceptor software selectively intercepts certain ones of the data streams having the flag set.

9. The data distribution device of claim 1, wherein the forwarding software is further configured to broadcast the selectively intercepted data stream to a subset of the at least one thin-client terminal system identified as the destination of the selectively intercepted data stream.

10. A method of selectively intercepting communications in a cloud computing environment, the method comprising:

receiving communications from at least one thin-client terminal system connected via a local area network;

determining at least one recipient of each communication; and based on a determination that the at least one recipient of a communication includes only thin-client terminal systems connected via the local area network:

intercepting the communication and preventing the communication from being transmitted to a central server connected to the local area network via a wide area network;

storing the communication; and forwarding the stored communication to the at least one recipient connected to the local area network, forwarding the stored communication including injecting the communication into a data stream transmitted from the central server to the at least one recipient.

11. The method of claim 10, further comprising:

based on a determination that the at least one recipient of the communication includes a device remote to the local area network, forwarding the communication to recipients connected to the local area network;

reducing a size of the communication by transcoding the communication from a first encoding format to a second encoding format; and transmitting the transcoded communication to the central server via the wide area network.

12. The method of claim 10, further comprising:

substituting the intercepted communication with an empty tagged communication; and transmitting the empty tagged communication to the central server.

13. The method of claim 10, wherein the communication is a multimedia data stream generated by a videoconferencing application.

14. The method of claim 10, further comprising receiving an instruction from the central server to selectively intercept the communication received from the at least one thin-client terminal system.

15. The method of claim 10, further comprising analyzing the each communication to identify a setting of a flag, wherein the each communication having the flag set is intercepted.

16. The method of claim 10, wherein forwarding the stored communication to the at least one recipient connected to the local area network comprises broadcasting the communication to the at least one recipient connected to the local area network.

\* \* \* \* \*